US010360128B2

United States Patent
Lingamneni

(10) Patent No.: US 10,360,128 B2
(45) Date of Patent: Jul. 23, 2019

(54) SYSTEM AND METHOD FOR DYNAMIC SCALING OF CONCURRENT PROCESSING THREADS

(71) Applicant: AMERICAN EXPRESS TRAVEL RELATED SERVICES COMPANY, INC., New York, NY (US)

(72) Inventor: Krishna K. Lingamneni, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 136 days.

(21) Appl. No.: 15/412,874

(22) Filed: Jan. 23, 2017

(65) Prior Publication Data

US 2018/0210804 A1  Jul. 26, 2018

(51) Int. Cl.
*G06F 11/34* (2006.01)
*G06F 11/30* (2006.01)
*G06F 9/455* (2018.01)
*G06F 9/50* (2006.01)

(52) U.S. Cl.
CPC ........ *G06F 11/3442* (2013.01); *G06F 9/4552* (2013.01); *G06F 9/5027* (2013.01); *G06F 11/3017* (2013.01); *G06F 9/45504* (2013.01)

(58) Field of Classification Search
CPC .......................... G06F 11/3442; G06F 11/3452
USPC ........................................................ 717/127
See application file for complete search history.

(56) References Cited

U.S. PATENT DOCUMENTS

| | | | | | |
|---|---|---|---|---|---|
| 6,256,775 | B1 * | 7/2001 | Flynn | ................... | G06F 9/3851 712/E9.053 |
| 6,658,654 | B1 * | 12/2003 | Berry | ................. | G06F 11/3409 714/E11.192 |
| 6,816,809 | B2 * | 11/2004 | Circenis | ............. | G06F 11/3423 702/178 |
| 7,552,042 | B1 * | 6/2009 | Brebner | ............. | G06F 17/5054 703/14 |
| 7,577,951 | B2 * | 8/2009 | Partamian | .......... | G06F 9/45504 717/114 |
| 7,617,488 | B2 * | 11/2009 | Srinivasan | ......... | G06F 11/3423 717/127 |
| 7,730,340 | B2 * | 6/2010 | Hu | ....................... | G06F 1/3203 713/323 |
| 8,205,100 | B2 * | 6/2012 | Saxe | .................... | G06F 1/3203 713/300 |
| 8,327,336 | B2 * | 12/2012 | Bates | ................... | G06F 11/362 717/124 |

(Continued)

OTHER PUBLICATIONS

"Dynamically Scaling Applications in the Cloud"; Luis M. Vaquero, Luis Rodero-Merino and Rajkumar Buyya—ACM SIGCOMM Computer Communication Review; vol. 41, No. 1, Jan. 2011.*

*Primary Examiner* — Francisco J Aponte
(74) *Attorney, Agent, or Firm* — Snell & Wilmer L.L.P.

(57) ABSTRACT

A system and method for the dynamic scaling of concurrent processing threads are provided. The system may include a scheduler, a master controller, a thread controller, a process invoker, a reprocess validator, and a server cluster comprising various managed servers. The master controller may to generate processing thread messages during an initial processing run. Thereafter, the master controller may dynamically scale the processing thread messages based on process performance data and system performance data.

20 Claims, 3 Drawing Sheets

(56) References Cited

U.S. PATENT DOCUMENTS

| | | | | |
|---|---|---|---|---|
| 8,402,443 B2* | 3/2013 | Greifeneder | ........ | G06F 11/3476 |
| | | | | 717/127 |
| 8,839,205 B2* | 9/2014 | Shafi | ................... | G06F 11/3664 |
| | | | | 702/119 |
| 9,348,401 B2* | 5/2016 | Weissmann | .............. | G06F 1/324 |
| 9,513,689 B2* | 12/2016 | Lim | ....................... | G06F 1/3206 |
| 9,632,823 B1* | 4/2017 | Allen | ..................... | G06F 9/4843 |
| 10,146,286 B2* | 12/2018 | Lee | ........................... | G06F 1/28 |
| 10,168,758 B2* | 1/2019 | Suryanarayanan | ...... | G06F 1/266 |
| 2004/0068340 A1* | 4/2004 | Mayberry | ............ | G06F 11/3409 |
| | | | | 700/108 |
| 2005/0132238 A1* | 6/2005 | Nanja | ................... | G06F 1/3203 |
| | | | | 713/300 |
| 2007/0074171 A1* | 3/2007 | Burka | ................. | G06F 9/45516 |
| | | | | 717/127 |
| 2008/0177686 A1* | 7/2008 | Buyuktosunoglu | .. | G05B 13/048 |
| | | | | 706/46 |
| 2014/0059552 A1* | 2/2014 | Cunningham | ........... | G09G 5/00 |
| | | | | 718/102 |
| 2015/0039753 A1* | 2/2015 | Zink | ................... | G06F 11/3442 |
| | | | | 709/224 |

* cited by examiner

SYSTEM AND METHOD FOR DYNAMIC SCALING OF CONCURRENT PROCESSING THREADS

FIELD

The disclosure generally relates to accessing and interacting with data using data services, and more specifically, to systems and methods for dynamic scaling of concurrent processing threads.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. Users and business processes may interact with the large data sets in a variety of circumstances. For example, users and business processes may interact with and process large data sets across multiple servers in a server cluster. During the processing of large data sets, each server may define a set number of processing threads to aid in the data processing. Due to the defined number of processing threads, each server may be under-utilized and/or over-utilized depending on the performance of data transfer services, downstream applications, and each server. Typically, each server is manually monitored to validate the status of the data processing and to avoid system failures.

SUMMARY

Systems, methods, and/or articles of manufacture (collectively, the "system") for dynamic scaling of concurrent processing threads are disclosed. In various embodiments, the system may generate a processing thread message and may invoke a process module on a managed server. The process module may be invoked based on the processing thread message. The process module may be configured to perform operations in response to being invoked. The system may monitor the process module to generate processing statistics data. The processing statistics data may include a process performance grade. The system may monitor the managed server to generate server statistics data, wherein the server statistics data includes at least one of a JVM utilization score, a CPU utilization score, or a disk utilization score. The system may generate a reprocess thread message based on the processing thread message.

In various embodiments, the system may calculate an average total of process performance grades based on the processing statistics data. The system may also calculate a service performance score based on the average total of process performance grades. The system may also calculate at least one of an average JVM utilization score, an average CPU utilization score, or an average disk utilization score. Each average score may be based on the server statistics data. The system may also calculate at least one of a JVM performance score, a CPU performance score, or a disk performance score based on the average scores.

In various embodiments, the system may calculate a final system performance score. The final system performance score may be based on at least one of the JVM performance score, the CPU performance score, the disk performance score, or the service performance score. The system may scale the processing thread messages based on the final system performance score. The final system performance score may also comprise a weighted average of at least one of the JVM performance score, the CPU performance score, the disk performance score, or the service performance score.

In various embodiments, the system may also retrieve an initial processing thread count and a processing thread allocation from a master controller property table. The system may also generate the processing thread message based on a number of processing threads specified in the initial processing thread count, wherein the processing thread message comprises data indicating the processing thread allocation.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
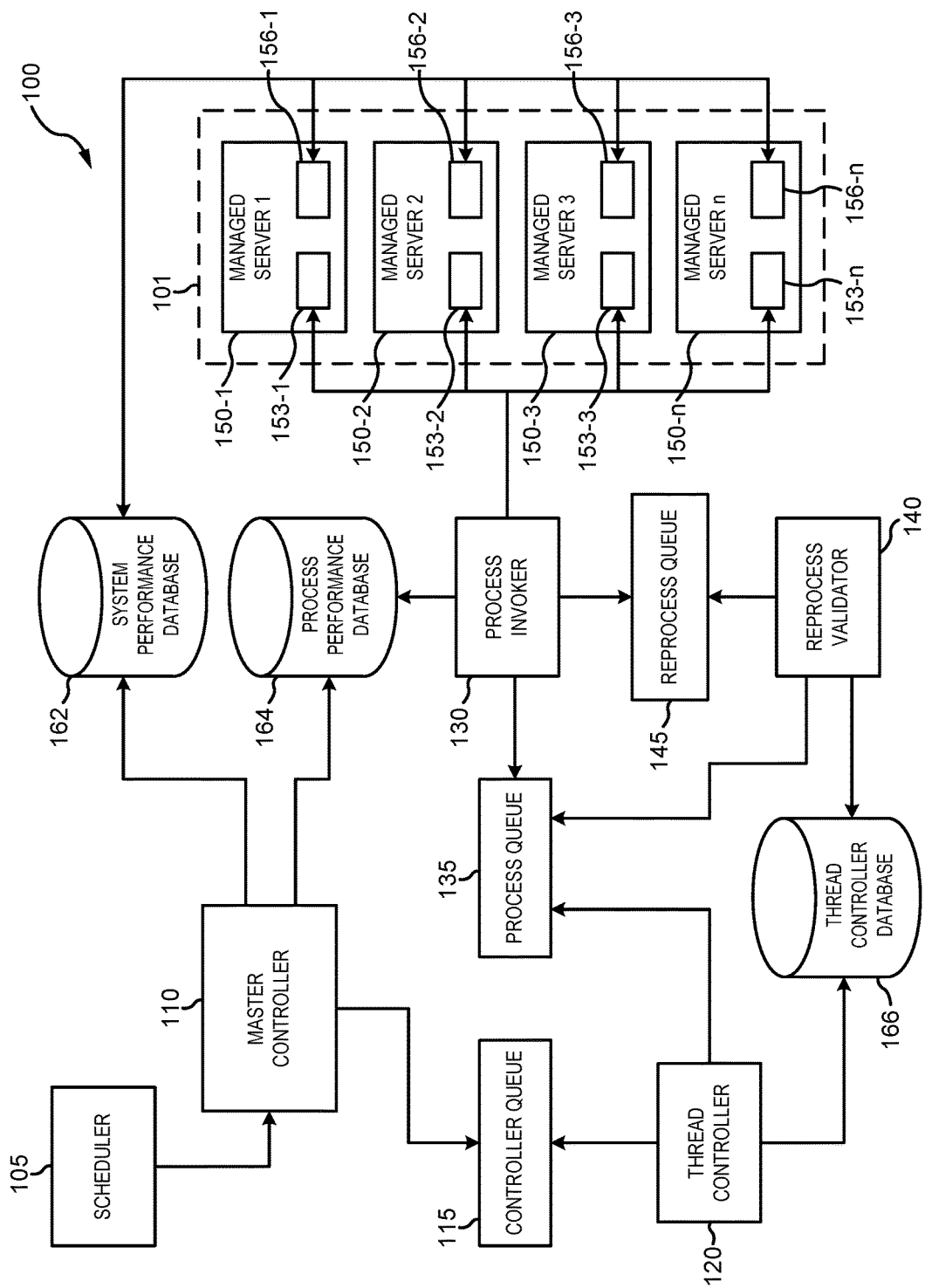
FIG. 1 is a block diagram illustrating various system components of a system for dynamic scaling of concurrent processing threads, in accordance with various embodiments.

In various embodiments, and with reference to FIG. 1, a system 100 for dynamic scaling of concurrent processing threads is disclosed. In general, system 100 may provide the capability to dynamically scale up and down the total number of concurrent processing threads in system 100. Such capability may be based on various performance indicating factors encompassing an overall performance of system 100. System 100 may at least partially reduce the underutilization and/or overutilization of system capacities caused by utilizing a fixed number of processing threads. System 100 may also distribute processing loads across managed servers based on the overall performance, thus at least partially reducing generic "round-robin" routing methodology through load balancers, and/or the like. Dynamically scaling concurrent processing threads may also allow system 100 to at least partially reduce the congestion of processing traffic into system 100 and to downstream applications and eliminate (or at least partially reduce) manual intervention in executing processes.

In various embodiments, system 100 may comprise various hardware, software, components, modules, and/or the like configured to aid in dynamically scaling concurrent processing threads. System 100 may comprise a mainframe environment, a business process management system (e.g., ORACLE® SOA Suite, etc.), and/or the like. System 100 may comprise a scheduler 105, a master controller 110, a thread controller 120, a process invoker 130, a reprocess validator 140, and/or a server cluster 101. System 100 may also comprise various databases, tables, and/or the like (e.g., a system performance database 162, a process performance database 164, and/or a thread controller database 166). System 100 may also comprise various queues, as described further herein, such as, for example, a controller queue 115, a process queue 135, and/or a reprocess queue 145. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, system 100 may comprise a server cluster 101. Server cluster 101 may comprise a network, server environment, JAVA® Virtual Machine, and/or the like having one or more interconnected servers. Server cluster 101 may comprise any suitable and/or desired number of servers. For example, server cluster 101 may comprise a first managed server 150-1, a second managed server 150-2, a third managed server 150-3, and/or an "Nth" managed server 150-n. Each managed server 150 may be configured to process data, execute business processes, and/or otherwise perform various operations and tasks. Each managed server 150 may comprise a virtual server (e.g., JAVA® Virtual Machine, and/or the like), a physical server, and/or any other suitable type of server.

In various embodiments, each managed server 150 may comprise various components, modules, and/or the like. For example, each managed server 150 may comprise a process module 153 (e.g., first managed server 150-1 may comprise a first process module 153-1, second managed server 150-2 may comprise a second process module 153-2, third managed server 150-3 may comprise a third process module 153-3, and/or "Nth" managed server 150-n may comprise an "Nth" process module 153-n). Each process module 153 may be configured to execute business processes, process data, and/or otherwise perform operations and/or tasks on the corresponding managed server 150, as discussed further herein. As a further example, each managed server 150 may also comprise a server statistics module 156 (e.g., first managed server 150-1 may comprise a first server statistics module 156-1, second managed server 150-2 may comprise a second server statistics module 156-2, third managed server 150-3 may comprise a third server statistics module 156-3, and/or "Nth" managed server 150-n may comprise an "Nth" server statistics module 156-n). Each server statistics module 156 may be configured to monitor each corresponding managed server 150 and capture a server statistic, as discussed further herein.

In various embodiments, scheduler 105 may be in electronic communication with master controller 110. Scheduler 105 may be configured to invoke master controller 110. For example, scheduler 105 may be configured to invoke master controller 110 on a periodic basis (e.g., every minute, every five minutes, every hour, every day, etc.). Scheduler 105 may also be configured to invoke master controller 110 based on a user input and/or a system event. For example, the user may configure scheduler 105 to invoke master controller 110 at any desired and/or suitable time where dynamic scaling of concurrent processing threads may be needed and/or desired. Scheduler 105 may also invoke master controller 110 in response to a system event, such as, for example, during a data processing where dynamic scaling of concurrent processing threads may be desirable (e.g., during processing of large amounts of data). As described further herein, scheduler 105 may invoke master controller 110 to initiate a first processing run, and may thereafter invoke master controller 110 to cause master controller 110 to dynamically scale the concurrent processing threads.

In various embodiments, a master controller 110 may be in electronic communication with scheduler 105, controller queue 115, system performance database 162, and/or process performance database 164. Master controller 110 may be configured as a central hub for system 100. In that respect, and as discussed further herein, master controller 110 may be configured to initiate a first processing run and thereafter dynamically scale concurrent processing threads based on system performance and/or process performance.

In various embodiments, master controller 110 may comprise a master controller property table. The master controller property table may comprise data related to the first processing run. For example, the master controller property table may include an initial processing thread count, a processing thread allocation, and/or the like. The initial processing thread count may comprise data on the initial number of processing threads for master controller 110 to run (e.g., 20 processing threads, 32 processing threads, etc.). The processing thread allocation may comprise data regarding the distribution of processing threads to each managed server within server cluster 101. For example, the processing thread allocation may specify for master controller 110 to evenly distribute the processing threads amongst each managed server, to prioritize distribution of the processing threads amongst the managed servers (e.g., first managed server 150-1 receives 30% of the processing threads, second managed server 150-2 receives 30% of the processing threads, third managed server 150-3 receives 25% of the processing threads, etc.), to assign the processing threads directly to a managed server 150, and/or any other suitable distribution.

In response to being invoked by scheduler 105, master controller 110 may initiate the first processing run. In that regard, master controller 110 may generate a first processing thread message. Master controller 110 may read from the master controller property table to determine the initial processing thread count and the processing thread allocation. Master controller 110 may generate a separate first processing thread message based on the number specified in the initial processing thread count (e.g., in response to the processing thread count indicating 32 processing threads, master controller 110 may generate 32 first processing thread messages). Each first processing thread message may also comprise data, tags, and/or the like indicating the processing thread allocation (e.g., "distributed", "first managed server 150-1", etc.), a total processing thread count, a processing instance name, a processing action type, and/or any other suitable data. Master controller 110 may transmit the first processing thread message to controller queue 115. Controller queue 115 may comprise a database, software, and/or the like configured to receive and store messages. Controller queue 115 may allow components of system 100 (e.g., thread controller 120), to subscribe to the queue in order to retrieve stored messages.

In various embodiments, a thread controller 120 may be in electronic communication with controller queue 115, process queue 135, and/or thread controller database 166. Thread controller 120 may subscribe to controller queue 115 to retrieve the first processing thread messages. Thread controller 120 may parse each first processing thread message to determine the properties of each first processing thread message. For example, thread controller 120 may parse the first processing thread messages to determine the processing thread allocation. Thread controller 120 may be configured generate a second processing thread message based on the first processing thread message. The second processing thread message may include a managed server assignment indicating the managed server 150 the second processing thread message is assigned to (e.g., first managed server 150-1, second managed server 150-2, etc.). For example, in response to thread controller 120 determining the processing thread allocation as "distributed" in the first processing thread message, thread controller 120 may balance the assigning of each second processing thread message across all the managed servers 150, such that each managed server 150 is assigned an approximately equal number of second processing thread messages. Thread controller 120 may transmit the second processing thread messages to process queue 135. Process queue 135 may comprise a database, software, and/or the like configured to receive and store the messages. Process queue 135 may allow components of system 100 (e.g., process invoker 130), to subscribe to the queue in order to retrieve stored messages.

In various embodiments, thread controller 120 may transmit data regarding each second processing thread message to a thread controller database 166. Thread controller database 166 may comprise any suitable database, storage table, and/or the like capable of storing data. Thread controller 120 may create entries in thread controller database 166 for each second processing thread message. For example, each entry may comprise data identifying the corresponding second processing thread message (e.g., via a unique thread name, tag, marker, and/or other suitable identifier), a thread status (e.g., "active", "inactive", etc.), the managed server assignment, and/or the like. Upon creation of each data entry, thread controller 120 may set the thread status to "active."

In various embodiments, a process invoker 130 may be in electronic communication with process queue 135, reprocess queue 145, server cluster 101, and/or process performance database 164. Process invoker 130 may subscribe to process queue 135 to retrieve the second processing thread messages. Process invoker 130 may analyze each second processing thread message to determine the managed server assignment. Process invoker 130 may invoke the process module 153 for each corresponding managed server 150 as designated in the second processing thread message. In response to being invoked by process invoker 130, each process module 153 may create a processing thread to allow the corresponding managed server 150 to process data, execute tasks, and/or the like. A processing thread may comprise allocated memory space, allocated CPU space, and/or the like. For example, each managed server 150, via the corresponding process module 153, may be configured to only analyze data and/or otherwise perform operations based on the number of concurrent processing threads available to the managed server 150. In that respect, a managed server 150 having more processing threads may be configured to concurrently perform more operations, and a managed server 150 having less processing threads may be configured to concurrently perform less operations, relative to a set number of processing threads.

In various embodiments, process invoker 130 may be configured to monitor each process module 153 to determine a processing statistics data. The processing statistics data may be related to the execution of processing threads on process module 153. For example, process invoker 130 may monitor a response time process module 153 takes to execute each processing thread. The processing statistics data may also comprise a process performance grade. For example, process invoker 130 may calculate the process performance grade based on the response time. For example, a response time of 4-6 seconds may be calculated as a "good" grade; a response time of 6-8 seconds may be calculated as an "average" grade; a response time above 8 seconds may be calculated as a "bad" grade; and/or any other suitable grading scale and/or system. Process invoker 130 may transmit the processing statistics data to process performance database 164. Process performance database 164 may comprise any suitable database, storage table, and/or the like capable of storing data. Process invoker 130 may create entries in process performance database 164 for each second processing thread message. Each entry may comprise data, such as, for example, identifying data (e.g., via the unique thread name, tag, marker, and/or other suitable identifier), the managed server assignment, the processing statistics data for each time the second processing thread message is processed, and/or the like.

In various embodiments, process invoker 130 may be configured to generate a reprocess thread message. Process invoker 130 may generate the reprocess thread message in response to one of the process modules 153 completing the processing of a processing thread. The reprocess thread message may comprise identifying data (e.g., via a unique thread name, tag, marker, and/or other suitable identifier), the managed server assignment, and/or the like. Process invoker 130 may transmit the reprocess thread message to reprocess queue 145. Reprocess queue 145 may comprise a database, software, and/or the like configured to receive and store messages. Reprocess queue 145 may allow components of system 100 (e.g., reprocess validator 140), to subscribe to the queue in order to retrieve messages.

In various embodiments, a reprocess validator 140 may be in electronic communication with reprocess queue 145 and/or thread controller database 166. Reprocess validator 140 may subscribe to reprocess queue 145 to retrieve the reprocess thread messages. Reprocess validator 140 may be configured to validate the reprocess thread message. Reprocess validator 140 may parse the reprocess thread message to determine the identifying data and/or the managed server assignment. Reprocess validator 140 may query thread controller database 166 to determine a thread status of the reprocess thread message (e.g., by querying based on the identifying data). In response to the thread status being "active", and/or the like, reprocess validator 140 may generate a third processing thread message. The third processing thread message may be similar to the second processing thread message. Reprocess validator 140 may transmit the third processing thread message to process queue 135. In response to the thread status being "inactive", and/or the like, reprocess validator 140 may clear the reprocess thread message without generating a new processing thread message. In that respect, reprocess validator 140 may iteratively loop, wherein "active" processing threads are continually reprocessed, and "inactive" processing threads are removed from processing.

In various embodiments, each server statistics module 156 may be configured to monitor each corresponding managed server 150 (e.g., first server statistics module 156-1 monitors first managed server 150-1, second server statistics module 156-2 monitors second managed server 150-2, third server statistics module 156-3 monitors third managed server 150-3, and/or Nth server statistics module 156-*n* monitors Nth managed server 150-*n*). Server statistics modules 156 may be configured to monitor in real time, at time intervals (e.g., every 30 seconds, etc.), and/or at any other suitable configuration. Each server statistics module 156 may monitor each corresponding managed server 150 to determine and/or capture various server statistics, such as, for example, JAVA® Virtual Machine ("JVM") memory utilization and/or free memory, CPU speed and/or utilization, disk read/write speeds and/or utilization, and/or any other suitable server statistics. Each server statistics module 156 may be configured to generate a server statistics data based on the monitoring. The server statistics data may include the captured server statistics, such as, for example, JVM memory utilization and/or free memory, CPU speed and/or utilization (e.g., a CPU speed utilization score), disk read/write speeds and/or utilization (e.g., a disk utilization score), and/or the like.

In various embodiments, the server statistics data may also include a JVM utilization score. Server statistics module 156 may be configured to calculate the JVM utilization score. The JVM utilization score may comprise a cumulative grade and/or individual grades for each managed server 150. The JVM utilization score may be based on the JVM memory utilization (e.g. the JVM memory utilized in comparison to the total JVM memory capacity for a given managed server 150). For example, a JVM free memory greater than 60% of the allocated memory may be calculated as a "good" grade; a JVM free memory of 30% to 60% of the allocated memory may be calculated as an "average" grade; a JVM free memory less than 30% of the allocated memory may be calculated as a "bad" grade; and/or any other suitable grading scale and/or system.

Server statistics modules 156 may transmit the server statistics data to system performance database 162. System performance database 162 may comprise any suitable database, storage table, and/or the like capable of storing data. Server statistics modules 156 may create entries in system performance database 162 grouped by each managed server 150 (e.g., via a unique managed server, IP address, MAC address, and/or other suitable identifier). In that respect, system performance database 162 may comprise entries for each managed server 150, with each entry comprising the corresponding server statistics data.

In various embodiments, master controller 110 may be configured to dynamically scale concurrent processing threads. For example, master controller 110 may be configured to dynamically scale the concurrent processing threads in response to being invoked by scheduler 105 after the initial processing run (e.g., a second invocation). In response to being invoked by scheduler 105 after the initial processing run, master controller 110 may query process performance database 164 and/or system performance database 162 to retrieve performance data related to each managed server 150. For example, master controller 110 may query process performance database 164 to retrieve the process statistics data for a given managed server 150. Master controller 110 may parse the process statistics data to determine the process performance grade. Master controller 110 may analyze the process performance grades to calculate an average total of each grade (e.g., an average total of "good" grades, an average total of "average" grades, an average total of "bad" grades, etc.). Based on the average total of each grade, master controller 110 may calculate a service performance score. The service performance score may comprise a numerical value, and/or any other suitable scoring metric. For example, in response to an average total of "good" grades being greater than 80% and an average total of "bad" grades being less than 5%, master controller 110 may assign a service performance score of 5; in response to an average total of "good" grades being less than 50% and an average total of "bad" grades being less than 10%, master controller 110 may assign a service performance score of 3; in response to an average total of "good" grades being less than 50% and an average total of "bad" grades being less than 25%, master controller 110 may assign a service performance score of 1; in response to an average total of "bad" grades being greater than 75%, master controller 110 may assign a service performance score of 0; and/or any other suitable scoring system. Master controller 110 may calculate the service performance score for each managed server 150 (e.g., a first service performance score for first managed server 150-1, a second service performance score for second managed server 150-2, etc.).

As a further example, and in various embodiments, master controller 110 may query system performance database 162 to retrieve all the server statistics data for a given managed server 150. Master controller 110 may parse the server statistics data to determine the JVM utilization score, the CPU utilization score, and/or the disk utilization score. Master controller 110 may analyze all of the JVM utilization scores, the CPU utilization scores, and/or the disk utilization scores to calculate an average total of each score. For example, master controller 110 may determine an average total of each grade for the JVM utilizations scores (e.g., an average total of "good" grades, an average total of "average" grades, an average total of "bad" grades, etc.).

In various embodiments, master controller 110 may calculate a JVM performance score. The JVM performance score may comprise a numerical value, and/or any other suitable scoring metric. For example, in response to an average total of "good" grades being greater than 80% and an average total of "bad" grades being approximately 0%, master controller 110 may assign a JVM performance score of 5; in response to an average total of "average" grades being greater than 50% and an average total of "bad" grades being approximately 0%, master controller 110 may assign a JVM performance score of 3; in response to an average total of "bad" grades being greater than 0%, master controller 110 may assign a JVM performance score of 0; and/or any other suitable scoring system. Master controller 110 may calculate the JVM performance score for each managed server 150 (e.g., a first JVM performance score for first managed server 150-1, a second JVM performance score for second managed server 150-2, etc.).

Master controller 110 may calculate a CPU performance score. The CPU performance score may comprise a numerical value, and/or any other suitable scoring metric. The CPU performance score may be based on a utilization of the CPU in comparison to a total CPU capacity of the given managed server 150 (e.g., 10%, 20%, 50%, etc.). For example, in response to an average CPU utilization being less than 0.7 (e.g., 70%), master controller 110 may assign a CPU performance score of 5; in response to an average CPU utilization being greater than 0.7 (e.g., 70%) but less than 1.0 (e.g., 100%), master controller 110 may assign a CPU performance score of 3; in response to an average CPU utilization being equal to or greater than 1.0 (100%), master controller 110 may assign a CPU performance score of 1; and/or any other suitable scoring system.

Master controller 110 may also calculate a disk performance score. The disk performance score may comprise a numerical value, and/or any other suitable scoring metric. For example, in response to the average free disk space being greater than 10 GB, master controller 110 may assign a disk performance score of 5; in response to the average free disk space being less than 10 GB but greater than 5 GB, master controller 110 may assign a disk performance score of 3; in response to the average free disk space being less than 5 GB, master controller 110 may assign a disk performance score of 1; and/or any other suitable scoring system.

In various embodiments, master controller 110 may calculate a final system performance score for each managed server 150. The final system performance score may comprise a numerical value, and/or any other suitable scoring value. The final system performance score may be based on at least one of the service performance score, the JVM performance score, the CPU performance score, and/or the disk performance score. In various embodiments, the master controller 110 may also weight at least one of the service performance score, the JVM performance score, the CPU performance score, and/or the disk performance score when calculating the final system performance score. For example, the service performance score may be weighted 70%, the JVM performance score may be weighted 12%, the CPU performance score may be weighted 12%, the disk utilization score may be weighted 6%, and/or any other suitable weighting values. In that respect, the final system performance score may comprise a weighted average of the service performance score, the JVM performance score, the CPU performance score, and/or the disk performance score. In other embodiments, the final system performance score may also comprise the weighted sum of the service performance score, the JVM performance score, the CPU performance score, and/or the disk performance score.

In various embodiments, master controller 110 may dynamically scale the concurrent processing threads based on the final system performance score. For example, master controller 110 may increase processing threads, decrease processing threads, skip (e.g., leave the number of processing threads the same), and/or generate an exception based on the final system performance score, as discussed further herein. For example, in response to the final system performance score comprising a "high" score (e.g., a final system performance score greater than 4.0), master controller 110 may be configured to increase the processing threads in the corresponding managed server 150 (e.g., by adding two additional processing threads). In response to the final system performance score comprising a "medium-high" score (e.g., a final system performance score less than 4.0 but greater than 3.5), master controller 110 may be configured to increase the processing threads in the corresponding managed server 150 (e.g., by adding one additional processing thread). Master controller 110 may spawn additional processing threads by generating a new processing thread message (e.g., a fourth processing thread message). The new processing thread message may be similar to the first processing thread messages created during the initial processing run. In that respect, the processing new thread message may comprise data, tags, and/or the like indicating the assigned managed server 150 the new processing thread message is assigned to. Master controller 110 may transmit the new processing thread message to controller queue 115. Thread controller 120 may retrieve the new processing thread message, and begin processing the new processing thread message similar to processing the first processing thread messages during the initial processing run.

In response to the final system performance score comprising a "medium" score (e.g., a final system performance score less than 3.5 but greater than 2.5), master controller 110 may be configured to make no changes and leave the number of processing threads in the corresponding managed server 150 the same. In response to the final system performance score comprise a "medium-low" score (e.g., a final system performance score less than 2.5 but greater than 2.0), master controller 110 may be configured to decrease the processing threads in the corresponding managed server 150 (e.g., by deactivating one processing thread). In response to the final system performance score comprising a "low" score (e.g., a final system performance score less than 2.0 but greater than 1.0), master controller 110 may be configured to decrease the processing threads in the corresponding managed server 150 (e.g., by deactivating two processing threads). Master controller 110 may decrease the processing threads in a corresponding managed server 150 by generating a decrease processing threads message. The decrease processing threads message may comprise data, tags, and/or the like indicating the corresponding managed server 150, the number of processing threads to decrease, and/or the like. Master controller 110 may transmit the decrease processing threads message to controller queue 115. Thread controller 120 may retrieve the decrease processing threads message from controller queue 115. Thread controller 120 may parse the decrease processing threads message to determine the corresponding managed server 150 and the number of processing threads to decrease. Thread controller 120 may query thread controller database 166 to locate processing thread records for the corresponding managed server 150. Thread controller 120 may update the thread status to "inactive" for a number of processing thread records equal to the number of processing threads to decrease.

In response to the final system performance score comprising an "emergency" score (e.g., a final system performance score less than 1.0), master controller 110 may be configured to generate an exception and deactivate all current processing threads for the corresponding managed server 150. Master controller 110 may deactivate all current processing threads for the corresponding managed server 150 by generating an exception processing thread message. The exception processing thread message may comprise data, tags, and/or the like indicating the corresponding managed server 150 and instructions to deactivate all associated processing threads. Master controller 110 may transmit the exception processing thread message to controller queue 115. Thread controller 120 may retrieve the exception processing thread message from controller queue 115. Thread controller 120 may parse the exception processing thread message to determine the corresponding managed server 150. Thread controller 120 may query thread controller database 166 to locate processing thread records for the corresponding managed server 150. Thread controller 120 may update the thread status to "inactive" for all of the processing threads assigned to the corresponding managed server 150.

Figure 2:
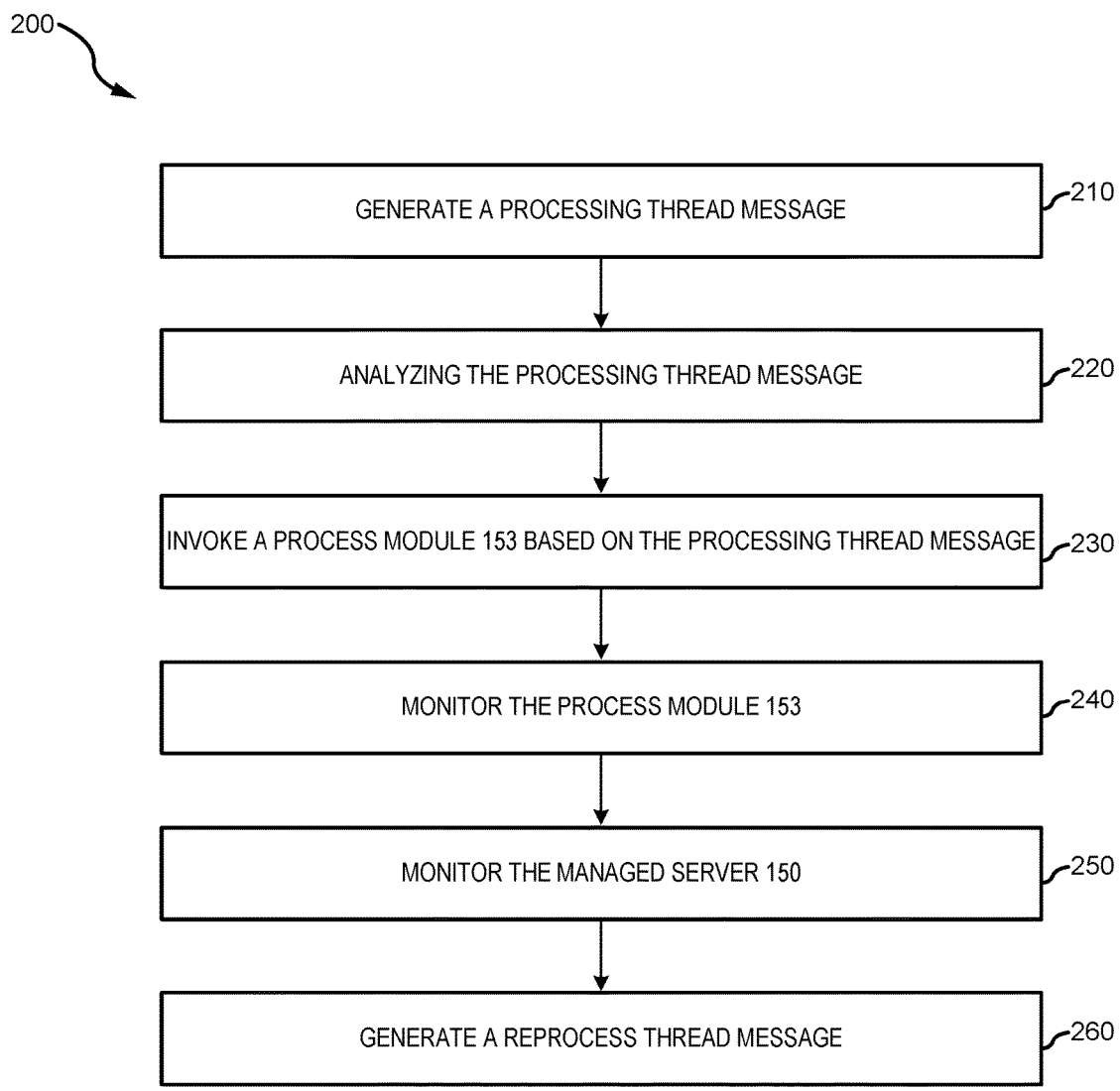
FIG. 2 illustrates a process flow for initiating a first processing run, in accordance with various embodiments.
Figure 3:
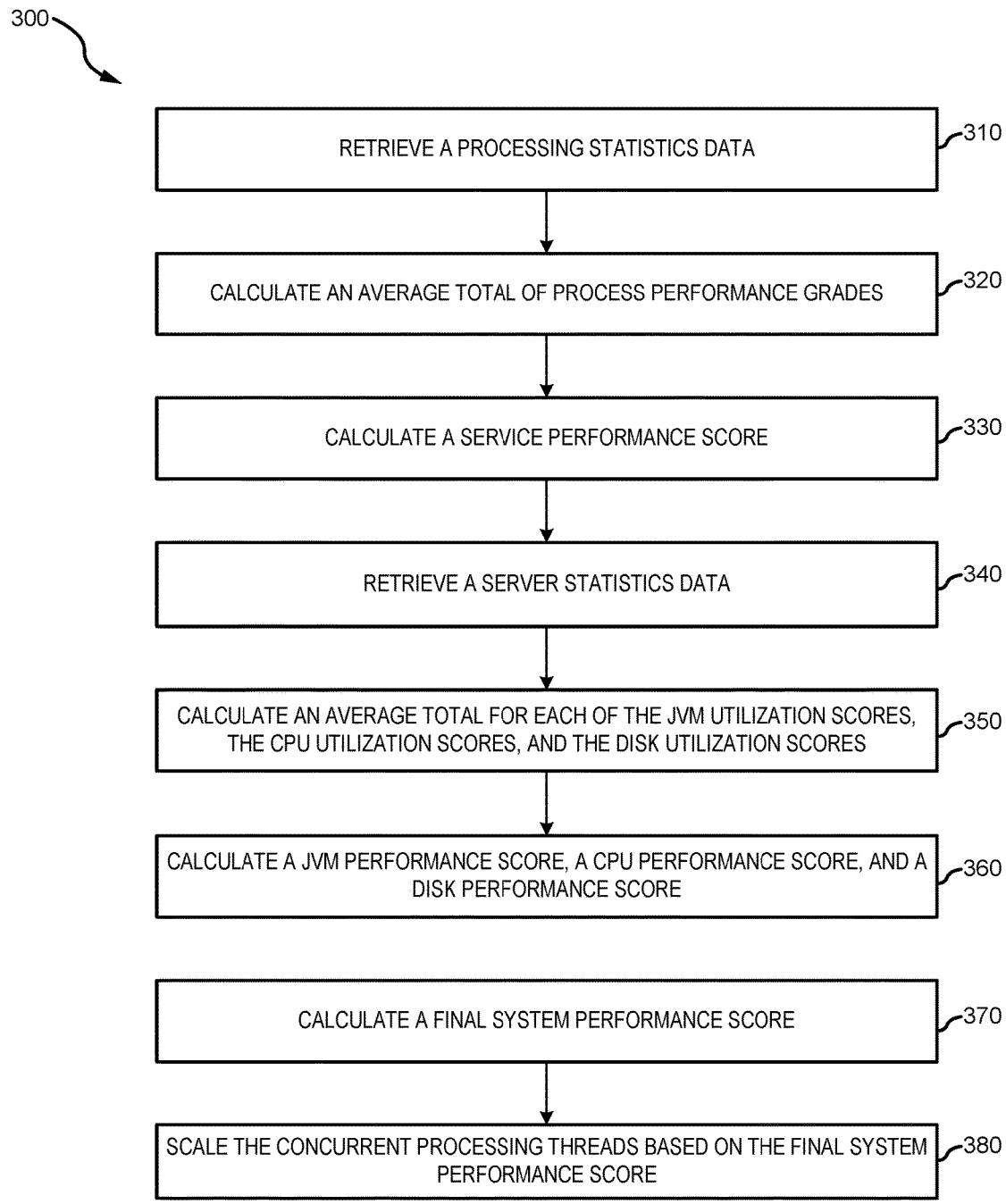
FIG. 3 illustrates a process flow for dynamically scaling concurrent processing threads, in accordance with various embodiments.

Referring now to FIGS. 2 and 3, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2 and 3, but also to the various system components as described above with reference to FIG. 1.

The methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

In various embodiments, and with reference to FIGS. 2 and 1, a method 200 for initiating a first processing run is disclosed. Master controller 110 may be configured to initiate the first processing run. Master controller 110 may initiate the first processing run in response to being invoked by scheduler 105. In various embodiments, method 200 may comprise generating a processing thread message (Step 210). Master controller 110 may generate the processing thread message. Master controller 110 may query a master controller property table to determine an initial processing thread count and a processing thread allocation. Master controller 110 may generate a separate processing thread message based on the number specified in the initial processing thread count. Each processing thread message may comprise data (e.g., a unique identifier), the processing thread allocation, and/or the like. Master controller 110 may transmit the processing thread message to controller queue 115.

In various embodiments, method 200 may comprise analyzing the processing thread message (Step 220). Thread controller 120 may be configured to analyze the processing thread message. Thread controller 120 may retrieve the processing thread message from controller queue 115. Thread controller 120 may analyze the processing thread message to determine the unique identifier and the processing thread allocation. Thread controller 120 may generate a second processing thread message based on the processing thread message. Thread controller 120 may generate a separate second processing thread message for each of the processing thread messages. Thread controller 120 may generate the second processing thread message to comprise the unique identifier, an assigned server, and/or the like. Thread controller 120 may transmit the second processing thread message to process queue 135. Thread controller 120 may also transmit a processing thread record to thread controller database 166 related to each of the second processing thread message. For example, thread controller database 166 may store the data grouped by the unique identifier, and may store data such as, a thread status (e.g., "active", "inactive", etc.), the managed server assignment, and/or the like.

In various embodiments, method 200 may comprise invoking a process module 153 based on the processing thread message (Step 230). Process invoker 130 may be configured to invoke process module 153. Process invoker 130 may retrieve each second processing thread message from process queue 135. Process invoker 130 may analyze each second processing thread message to determine the managed server assignment. Process invoker 130 may invoke the process module 153 for each corresponding managed server 150 as designated in the second processing thread message. In response to being invoked by process invoker 130, each process module 153 may create a processing thread to allow the corresponding managed server 150 to process data, execute tasks, and/or the like.

In various embodiments, method 200 may comprise monitoring the process module 153 (Step 240). Process invoker 130 may be configured to monitor each process module 153. Process invoker 130 may monitor each process module 153 to determine a processing statistics data. The processing statistics data may be related to the execution of processing threads on process module 153. For example, process invoker 130 may monitor a response time process module 153 takes to execute each processing thread. The processing statistics data may also comprise a process performance grade. For example, process invoker 130 may calculate the process performance grade based on the response time. For example, a response time of 4-6 seconds may be calculated as a "good" grade; a response time of 6-8 seconds may be calculated as an "average" grade; a response time above 8 seconds may be calculated as a "bad" grade; and/or any other suitable grading scale and/or system. Process invoker 130 may transmit the processing statistics data to process performance database 164. Process performance database 164 may comprise any suitable database, storage table, and/or the like capable of storing data. Process invoker 130 may create entries in process performance database 164 for each second processing thread message. Each entry may comprise data, such as, for example, identifying data (e.g., via the unique thread name, tag, marker, and/or other suitable identifier), the managed server assignment, the processing statistics data for each time the second processing thread message is processed, and/or the like.

In various embodiments, method 200 may comprise monitoring the managed server 150 (Step 250). Server statistics module 156 may be configured to monitor each corresponding managed server 150. Server statistics modules 156 may be configured to monitor in real time, at time intervals (e.g., every 30 seconds, etc.), and/or at any other suitable configuration. Each server statistics module 156 may monitor each corresponding managed server 150 to determine and/or capture various server statistics, such as, for example, JAVA® Virtual Machine ("JVM") memory utilization and/or free memory, CPU speed and/or utilization, disk read/write speeds and/or utilization, and/or any other suitable server statistics. Each server statistics module 156 may be configured to generate a server statistics data based on the monitoring. The server statistics data may include the captured server statistics, such as, for example, JVM memory utilization and/or free memory, CPU speed and/or utilization, disk read/write speeds and/or utilization, and/or the like. The server statistics data may also include a JVM utilization score. Server statistics module 156 may be configured to calculate the JVM utilization score. The JVM utilization score may comprise a cumulative grade and/or individual grades for each managed server 150. The JVM utilization score may be based on the JVM memory utilization. For example, a JVM free memory greater than 60% of the allocated memory may be calculated as a "good" grade; a JVM free memory of 30% to 60% of the allocated memory may be calculated as an "average" grade; a JVM free memory less than 30% of the allocated memory may be calculated as a "bad" grade; and/or any other suitable grading scale and/or system. Server statistics modules 156 may transmit the server statistics data to system performance database 162. Server statistics modules 156 may create entries in system performance database 162 grouped by each managed server 150 (e.g., via a unique managed server, IP address, MAC address, and/or other suitable identifier). In that respect, system performance database 162 may comprise entries for each managed server 150, with each entry comprising the corresponding server statistics data.

In various embodiments, method 200 may comprise generating a reprocess thread message (Step 260). Process invoker 130 may be configured to generate the reprocess thread message. Process invoker 130 may generate the reprocess thread message in response to one of the process modules 153 completing the processing of a processing thread. The reprocess thread message may comprise identifying data (e.g., via a unique thread name, tag, marker, and/or other suitable identifier), the managed server assignment, and/or the like. Process invoker 130 may transmit the reprocess thread message to reprocess queue 145. Reprocess validator 140 may be configured to retrieve the reprocess thread messages from reprocess queue 145. Reprocess validator 140 may be configured to validate the reprocess thread message. Reprocess validator 140 may parse the reprocess thread message to determine the identifying data and/or the managed server assignment. Reprocess validator 140 may query thread controller database 166 to determine a thread status of the reprocess thread message (e.g., by querying based on the identifying data). In response to the thread status being "active", and/or the like, reprocess validator 140 may generate a third processing thread message. The third processing thread message may be similar to the second processing thread message. Reprocess validator 140 may transmit the third processing thread message to process queue 135. In response to the thread status being "inactive", and/or the like, reprocess validator 140 may clear the reprocess thread message without generating a new processing thread message. In that respect, reprocess validator 140 may iteratively loop, wherein "active" processing threads are continually reprocessed, and "inactive" processing threads are removed from processing.

In various embodiments, and with reference to FIGS. 3 and 1, a method 300 for dynamically scaling concurrent processing threads is disclosed. Master controller 110 may be configured to dynamically scale the concurrent processing threads, as discussed further herein. In that regard, master controller 110 may dynamically scale the concurrent processing threads in response to being invoked by scheduler 105, after the initial first processing run. In various embodiments, method 300 may comprise retrieving a processing statistics data (Step 310). Master controller 110 may retrieve the processing statistics data. master controller 110 may query process performance database 164 to retrieve the process statistics data for a given managed server 150. Master controller 110 may parse the process statistics data to determine the process performance grade.

In various embodiments, method 300 may comprise calculating an average total of process performance grades (Step 320). Master controller 110 may be configured to calculate the average total of process performance grades. Master controller 110 may analyze the process performance grades to calculate an average total of each grade (e.g., an average total of "good" grades, an average total of "average" grades, an average total of "bad" grades, etc.). In various embodiments, method 300 may comprise calculating a service performance score (Step 330). Master controller 10 may calculate the service performance score. The service performance score may be based on the average total of each grade. Based on the average total of each grade, master controller 110 may calculate a service performance score. The service performance score may comprise a numerical value, and/or any other suitable scoring metric. For example, in response to an average total of "good" grades being greater than 80% and an average total of "bad" grades being less than 5%, master controller 110 may assign a service performance score of 5; in response to an average total of "good" grades being less than 50% and an average total of "bad" grades being less than 10%, master controller 110 may assign a service performance score of 3; in response to an average total of "good" grades being less than 50% and an average total of "bad" grades being less than 25%, master controller 110 may assign a service performance score of 1; in response to an average total of "bad" grades being greater than 75%, master controller 110 may assign a service performance score of 0; and/or any other suitable scoring system. Master controller 110 may calculate the service performance score for each managed server 150 (e.g., a first service performance score for first managed server 150-1, a second service performance score for second managed server 150-2, etc.).

In various embodiments, method 300 may comprise retrieving a server statistics data (Step 340). Master controller 110 may be configured to retrieve the server statistics data. Master controller 110 may query system performance database 162 to retrieve all the server statistics data for a given managed server 150. Master controller 110 may parse the server statistics data to determine the JVM utilization score, the CPU utilization score, and/or the disk utilization score. In various embodiments, method 300 may comprise calculating an average total for each of the JVM utilization scores (an average JVM utilization score), the CPU utilization scores (an average CPU utilization score), and the disk utilization scores (an average disk utilization score) (Step 350). Master controller 110 may analyze all of the JVM utilization scores, the CPU utilization scores, and/or the disk utilization scores to calculate an average total of each score. For example, master controller 110 may determine an average total of each grade for the JVM utilizations scores (e.g., an average total of "good" grades, an average total of "average" grades, an average total of "bad" grades, etc.).

In various embodiments, method 300 may comprise calculating a JVM performance score, a CPU performance score, and a disk performance score (Step 360). Master controller 110 may be configured to calculate the JVM performance score, the CPU performance score, and the disk performance score. The JVM performance score may comprise a numerical value, and/or any other suitable scoring metric. For example, in response to an average total of "good" grades being greater than 80% and an average total of "bad" grades being approximately 0%, master controller 110 may assign a JVM performance score of 5; in response to an average total of "average" grades being greater than 50% and an average total of "bad" grades being approximately 0%, master controller 110 may assign a JVM performance score of 3; in response to an average total of "bad" grades being greater than 0%, master controller 110 may assign a JVM performance score of 0; and/or any other suitable scoring system. Master controller 110 may calculate the JVM performance score for each managed server 150 (e.g., a first JVM performance score for first managed server 150-1, a second JVM performance score for second managed server 150-2, etc.). The CPU performance score may comprise a numerical value, and/or any other suitable scoring metric. For example, in response to an average CPU utilization being less than 0.7, master controller 110 may assign a CPU performance score of 5; in response to an average CPU utilization being greater than 0.7 but less than 1.0, master controller 110 may assign a CPU performance score of 3; in response to an average CPU utilization being greater than 1.0, master controller 110 may assign a CPU performance score of 1; and/or any other suitable scoring system. The disk performance score may comprise a numerical value, and/or any other suitable scoring metric. For example, in response to the average free disk space being greater than 10 GB, master controller 110 may assign a disk performance score of 5; in response to the average free disk space being less than 10 GB but greater than 5 GB, master controller 110 may assign a disk performance score of 3; in response to the average free disk space being less than 5 GB, master controller 110 may assign a disk performance score of 1; and/or any other suitable scoring system.

In various embodiments, method 300 may comprise calculating a final system performance score (Step 370). Master controller 110 may be configured to calculate the final system performance score. The final system performance score may comprise a numerical value, and/or any other suitable scoring value. The final system performance score may be based on at least one of the service performance score, the JVM performance score, the CPU performance score, and/or the disk performance score. In various embodiments, the master controller 110 may also weight at least one of the service performance score, the JVM performance score, the CPU performance score, and/or the disk performance score when calculating the final system performance score. For example, the service performance score may be weighted 70%, the JVM performance score may be weighted 12%, the CPU performance score may be weighted 12%, the disk utilization score may be weighted 6%, and/or any other suitable weighting values. In that respect, the final system performance score may comprise a weighted average of the service performance score, the JVM performance score, the CPU performance score, and/or the disk performance score. In other embodiments, the final system performance score may also comprise the weighted sum of the service performance score, the JVM performance score, the CPU performance score, and/or the disk performance score.

In various embodiments, method 300 may comprise scaling the concurrent processing threads based on the final system performance score (Step 380). Master controller 110 may be configured to dynamically scale the concurrent processing threads based on the final system performance score. Master controller 110 may dynamically scale the concurrent processing threads based on the final system performance score. For example, master controller 110 may increase processing threads, decrease processing threads, skip (e.g., leave the number of processing threads the same), and/or generate an exception based on the final system performance score, as discussed further herein. For example, in response to the final system performance score comprising a "high" score (e.g., a final system performance score greater than 4.0), master controller 110 may be configured to increase the processing threads in the corresponding managed server 150 (e.g., by adding two additional processing threads). In response to the final system performance score comprising a "medium-high" score (e.g., a final system performance score less than 4.0 but greater than 3.5), master controller 110 may be configured to increase the processing threads in the corresponding managed server 150 (e.g., by adding one additional processing thread). Master controller 110 may spawn additional processing threads by generating a new processing thread message (e.g., a fourth processing thread message). The new processing thread message may be similar to the first processing thread messages created during the initial processing run. In that respect, the processing new thread message may comprise data, tags, and/or the like indicating the assigned managed server 150 the new processing thread message is assigned to. Master controller 110 may transmit the new processing thread message to controller queue 115. Thread controller 120 may retrieve the new processing thread message, and begin processing the new processing thread message similar to processing the first processing thread messages during the initial processing run.

In response to the final system performance score comprising a "medium" score (e.g., a final system performance score less than 3.5 but greater than 2.5), master controller 110 may be configured to make no changes and leave the number of processing threads in the corresponding managed server 150 the same. In response to the final system performance score comprise a "medium-low" score (e.g., a final system performance score less than 2.5 but greater than 2.0), master controller 110 may be configured to decrease the processing threads in the corresponding managed server 150 (e.g., by deactivating one processing thread). In response to the final system performance score comprising a "low" score (e.g., a final system performance score less than 2.0 but greater than 1.0), master controller 110 may be configured to decrease the processing threads in the corresponding managed server 150 (e.g., by deactivating two processing threads). Master controller 110 may decrease the processing threads in a corresponding managed server 150 by generating a decrease processing threads message. The decrease processing threads message may comprise data, tags, and/or the like indicating the corresponding managed server 150, the number of processing threads to decrease, and/or the like. Master controller 110 may transmit the decrease processing threads message to controller queue 115. Thread controller 120 may retrieve the decrease processing threads message from controller queue 115. Thread controller 120 may parse the decrease processing threads message to determine the corresponding managed server 150 and the number of processing threads to decrease. Thread controller 120 may query thread controller database 166 to locate processing thread records for the corresponding managed server 150. Thread controller 120 may update the thread status to "inactive" for a number of processing thread records equal to the number of processing threads to decrease.

In response to the final system performance score comprising an "emergency" score (e.g., a final system performance score less than 1.0), master controller 110 may be configured to generate an exception and deactivate all current processing threads for the corresponding managed server 150. Master controller 110 may deactivate all current processing threads for the corresponding managed server 150 by generating an exception processing thread message. The exception processing thread message may comprise data, tags, and/or the like indicating the corresponding managed server 150 and instructions to deactivate all associated processing threads. Master controller 110 may transmit the exception processing thread message to controller queue 115. Thread controller 120 may retrieve the exception processing thread message from controller queue 115. Thread controller 120 may parse the exception processing thread message to determine the corresponding managed server 150. Thread controller 120 may query thread controller database 166 to locate processing thread records for the corresponding managed server 150. Thread controller 120 may update the thread status to "inactive" for all of the processing threads assigned to the corresponding managed server 150.

The disclosure and claims do not describe only a particular outcome of executing data service requests, but the disclosure and claims include specific rules for implementing the outcome of dynamically scaling current processing threads and that render information into a specific format that is then used and applied to create the desired results of dynamically scaling concurrent processing threads, as set forth in *McRO, Inc. v. Bandai Namco Games America Inc.* (Fed. Cir. case number 15-1080, Sep. 13, 2016). In other words, the outcome of dynamically scaling concurrent processing threads can be performed by many different types of rules and combinations of rules, and this disclosure includes various embodiments with specific rules. While the absence of complete preemption may not guarantee that a claim is eligible, the disclosure does not sufficiently preempt the field of dynamically scaling concurrent processing threads at all. The disclosure acts to narrow, confine, and otherwise tie down the disclosure so as not to cover the general abstract idea of just dynamically scaling concurrent processing threads. Significantly, other systems and methods exist for dynamically scaling concurrent processing threads, so it would be inappropriate to assert that the claimed invention preempts the field or monopolizes the basic tools of dynamically scaling concurrent processing threads. In other words, the disclosure will not prevent others from dynamically scaling concurrent processing threads, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system may include alerting a user when their computer (e.g., managed servers 150) is offline. The system may include generating customized information and alerting a remote user that the information can be accessed from their computer (e.g., managed servers 150). The alerts are generated by filtering received information, building information alerts and formatting the alerts into data blocks based upon user preference information. The data blocks are transmitted to the user's wireless device which, when connected to the computer, causes the computer to auto-launch an application to display the information alert and provide access to more detailed information about the information alert. More particularly, the system may comprise providing a viewer application to a user for installation on the remote user computer; receiving information at a transmission server (e.g., a managed server 150) sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote user computer and to enable connection via the URL to the data source over the Internet when the wireless device is locally connected to the remote user computer and the remote user computer comes online.

In various embodiments, the system may include a graphical user interface for dynamically relocating/rescaling obscured textual information of an underlying window to become automatically viewable to the user. By permitting textual information to be dynamically relocated based on an overlap condition, the computer's (e.g., managed servers 150) ability to display information is improved. More particularly, the system may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., a processing thread message) to prevent a computer (e.g., managed servers 150) from being compromised, for example by being infected with a computer virus, when a user requests or interacts with virtual tokens. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over users during name, using a system for co-marketing the "look and feel" of the host web page (e.g., a web page hosted by system 100) with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer, via a managed server 150, for example, so that she effectively remains on the host web page to search for a name without being redirected to the third party merchant affiliate. Because such composite pages are visually perceived by the customer as associated with the host web page, they give the customer the impression that she is viewing pages served by the host. Further, the customer is able to search for a name without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

As used herein, "transmit" may include sending electronic data from one system component to another over a network connection. Additionally, as used herein, "data" may include encompassing information such as commands, queries, files, data for storage, and the like in digital or any other form. The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to an "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a HADOOP® cluster configured to process and store big data sets with some of nodes comprising a distributed storage system and some of nodes comprising a distributed processing system. In that regard, distributed computing cluster may be configured to support a HADOOP® distributed file system (HDFS) as specified by the Apache Software Foundation at http://hadoop.apache.org/docs/. For more information on big data management systems, see U.S. Serial No. 14/944,902 titled INTEGRATED BIG DATA INTERFACE FOR MULTIPLE STORAGE TYPES and filed on Nov. 18, 2015; U.S. Ser. No. 14/944,979titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., FACEBOOK®, YOUTUBE®, APPLE®TV®, PANDORA®, XBOX®, SONY® PLAYSTATION®), a uniform resource locator ("URL"), a document (e.g., a MICROSOFT® WORD® document, a MICROSOFT® EXCEL® document, an ADOBE® .pdf document, etc.), an "ebook," an "emagazine," an application or microapplication (as described herein), an SMS or other type of text message, an email, a FACEBOOK® message, a TWITTER® tweet, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK°, FOURSQUARE®, TWITTER®, MYSPACE®, LINKEDIN, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g., WEBSPHERE®, WEBLOGIC®, JBOSS®, EDB® POSTGRES PLUS ADVANCED SERVER® (PPAS), etc.). In various embodiments, the server may include web servers (e.g. APACHE, IIS, GOOGLE® Web Server (GWS), SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, NY), various database products available from ORACLE® Corporation (Redwood Shores, CA), MICROSOFT® ACCESS®, MICROSOFT® SQL Server® by MICROSOFT® Corporation (Redmond, Washington), MYSQL® by MySQL AB (Uppsala, Sweden), MONGODB®, REDIS®, APACHE CASSANDRA®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL SERVER® database system, and a MICROSOFT® Commerce Server. Additionally, components such as MICROSFOT® ACCESS® or MICROSOFT® SQL SERVER®, ORACLE®, SYBASE®, INFORMIX®, MYSQL®, INTERBASE®, etc., may be used to provide an Active Data Object (ADO) compliant database management system. In one embodiment, the APACHE® web server is used in conjunction with a LINUX® operating system, a MYSQL® database, and the PERL®, PHP, and/or PYTHON® programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQTM (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia Cold Fusion, COBOL, MICROSOFT® Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using NODE.JS®. NODE.JS® may implement several modules to handle various core functionalities. For example, a package management module, such as NPM®, may be implemented as an open source library to aid in organizing the installation and management of third-party NODE.JS® programs. NODE.JS® may also implement a process manager, such as, for example, Parallel Multithreaded Machine ("PM2"); a resource and performance monitoring tool, such as, for example, Node Application Metrics ("appmetrics"); a library module for building user interfaces, such as for example REACHJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    generating, by a processor, a processing thread message comprising a processing thread allocation and a processing action type;
    invoking, by the processor, a process module on a managed server, wherein the process module is invoked based on the processing thread message, and wherein the process module is configured to perform operations in response to being invoked based on the processing action type;
    monitoring, by the processor, the process module to generate a processing statistics data, wherein the processing statistics data comprises at least one of a processing thread execution response time or a process performance grade based on the processing thread execution response time;
    monitoring, by the processor, the managed server to generate a server statistics data, wherein the server statistics data comprises a Java Virtual Machine (JVM) utilization score, a CPU utilization score, and a disk utilization score, wherein the JVM utilization score is based on a JVM memory utilization in the managed server, wherein the CPU utilization score is based on at least one of a CPU processing speed or a CPU utilization in the managed server, and wherein the disk utilization score is based on at least one of a disk read/write speed or a disk utilization in the managed server;
    generating, by the processor, a reprocess thread message in response to the process module completing processing of the processing thread message, wherein the reprocess thread message comprises a thread status of active or inactive;
    calculating, by the processor, a final system performance score based on at least one of a JVM performance score, a CPU performance score, a disk performance score, or a service performance score, wherein each performance score is based on an average score of each server statistics data; and
    scaling, by the processor, a number of processing thread messages based on the final system performance score, wherein the processing thread messages are scaled by increasing processing thread messages, decreasing processing thread messages, keeping the same processing thread messages, or generating an exception.

2. The method of claim 1, further comprising:
    calculating, by the processor, an average total of process performance grades based on the processing statistics data; and
    calculating, by the processor, the service performance score based on the average total of process performance grades.

3. The method of claim 2, further comprising:
    calculating, by the processor, at least one of an average JVM utilization score, an average CPU utilization score, or an average disk utilization score, wherein each score is based on the server statistics data; and
    calculating, by the processor, at least one of the JVM performance score, the CPU performance score, or the disk performance score based on the average scores.

4. The method of claim 1, wherein the final system performance score comprises a weighted average of at least one of the service performance score, the JVM performance score, the CPU performance score, or the disk performance score.

5. The method of claim 1, further comprising:
    retrieving, by the processor, an initial processing thread count and the processing thread allocation from a master controller property table; and
    generating, by the processor, the processing thread message based on a number of processing threads specified in the initial processing thread count, wherein the processing thread message comprises data indicating the processing thread allocation.

6. The system of claim 1, wherein the final system performance score comprises a weighted average of at least one of the service performance score, the JVM performance score, the CPU performance score, or the disk performance score.

7. The method of claim 1, wherein in response to the final system performance score comprising a high score, the scaling the processing thread messages comprises increasing a number of processing thread messages.

8. The method of claim 1, wherein in response to the final system performance score comprising a medium-high score, the scaling the processing thread messages comprises generating a new processing thread message.

9. The method of claim 1, wherein in response to the final system performance score comprising a medium score, the scaling the processing thread messages comprises keeping the same number of processing thread messages.

10. The method of claim 1, wherein in response to the final system performance score comprising a medium-low score, the scaling the processing thread messages comprises deactivating the processing thread message.

11. The method of claim 1, wherein in response to the final system performance score comprising a low score, the scaling the processing thread messages comprises decreasing a number of processing thread messages.

12. The method of claim 1, wherein in response to the final system performance score comprising an emergency score, the scaling the processing thread messages comprises generating the exception and deactivating all processing thread messages.

13. A system comprising:
    a processor; and
    a tangible, non-transitory memory configured to communicate with the processor, the tangible, non-transitory memory having instructions stored thereon that, in response to execution by the processor, cause the processor to perform operations comprising:
        generating, by the processor, a processing thread message comprising a processing thread allocation and a processing action type;
        invoking, by the processor, a process module on a managed server, wherein the process module is invoked based on the processing thread message, and wherein the process module is configured to perform operations in response to being invoked based on the processing action type;

monitoring, by the processor, the process module to generate a processing statistics data, wherein the processing statistics data comprises at least one of a processing thread execution response time or a process performance grade based on the processing thread execution response time;

monitoring, by the processor, the managed server to generate a server statistics data, wherein the server statistics data comprises a Java Virtual Machine (JVM) utilization score, a CPU utilization score, and a disk utilization score, wherein the JVM utilization score is based on a JVM memory utilization in the managed server, wherein the CPU utilization score is based on at least one of a CPU processing speed or a CPU utilization in the managed server, and wherein the disk utilization score is based on at least one of a disk read/write speed or a disk utilization in the managed server;

generating, by the processor, a reprocess thread message in response to the process module completing processing of the processing thread message, wherein the reprocess thread message comprises a thread status of active or inactive calculating, by the processor, a final system performance score based on at least one of a JVM performance score, a CPU performance score, a disk performance score, or a service performance score, wherein each performance score is based on an average score of each server statistics data; and scaling, by the processor, a number of the processing thread messages based on the final system performance score, wherein the processing thread messages are scaled by increasing processing thread messages, decreasing processing thread messages, keeping the same processing thread messages, or generating an exception.

14. The system of claim 13, further comprising:
calculating, by the processor, an average total of process performance grades based on the processing statistics data; and
calculating, by the processor, the service performance score based on the average total of process performance grades.

15. The system of claim 14, further comprising:
calculating, by the processor, at least one of an average JVM utilization score, an average CPU utilization score, or an average disk utilization score, wherein each score is based on the server statistics data; and
calculating, by the processor, at least one of the JVM performance score, the CPU performance score, or the disk performance score based on the average scores.

16. The system of claim 13, further comprising:
retrieving, by the processor, an initial processing thread count and the processing thread allocation from a master controller property table; and
generating, by the processor, the processing thread message based on a number of processing threads specified in the initial processing thread count, wherein the processing thread message comprises data indicating the processing thread allocation.

17. An article of manufacture including a non-transitory, tangible computer readable storage medium having instructions stored thereon that, in response to execution by a computer based system, cause the computer based system to perform operations comprising:

generating, by the computer based system, a processing thread message comprising a processing thread allocation and a processing action type;

invoking, by the computer based system, a process module on a managed server, wherein the process module is invoked based on the processing thread message, and wherein the process module is configured to perform operations in response to being invoked based on the processing action type;

monitoring, by the computer based system, the process module to generate a processing statistics data, wherein the processing statistics data comprises at least one of a processing thread execution response time or a process performance grade based on the processing thread execution response time;

monitoring, by the computer based system, the managed server to generate a server statistics data, wherein the server statistics data comprises a Java Virtual Machine (JVM) utilization score, a CPU utilization score, and a disk utilization score, wherein the JVM utilization score is based on a JVM memory utilization in the managed server, wherein the CPU utilization score is based on at least one of a CPU processing speed or a CPU utilization in the managed server, and wherein the disk utilization score is based on at least one of a disk read/write speed or a disk utilization in the managed server;

generating, by the computer based system, a reprocess thread message in response to the process module completing processing of the processing thread message, wherein the reprocess thread message comprises a thread status of active or inactive calculating, by the computer based system, a final system performance score based on at least one of a JVM performance score, a CPU performance score, a disk performance score, or a service performance score, wherein each performance score is based on an average score of each server statistics data; and scaling, by the computer based system, a number of the processing thread messages based on the final system performance score, wherein the processing thread messages are scaled by increasing processing thread messages, decreasing processing thread messages, keeping the same processing thread messages, or generating an exception.

18. The article of manufacture of claim 17, further comprising:
calculating, by the computer based system, an average total of process performance grades based on the processing statistics data;
calculating, by the computer based system, the service performance score based on the average total of process performance grades;
calculating, by the computer based system, at least one of an average JVM utilization score, an average CPU utilization score, or an average disk utilization score, wherein each score is based on the server statistics data; and
calculating, by the computer based system, at least one of the JVM performance score, the CPU performance score, or the disk performance score based on the average scores.

19. The article of manufacture of claim 17, wherein the final system performance score comprises a weighted average of at least one of the service performance score, the JVM performance score, the CPU performance score, or the disk performance score.

20. The article of manufacture of claim 17, further comprising:
retrieving, by the computer based system, an initial processing thread count and the processing thread allocation from a master controller property table; and
generating, by the computer based system, the processing thread message based on a number of processing threads specified in the initial processing thread count, wherein the processing thread message comprises data indicating the processing thread allocation.

* * * * *